Nov. 9, 1937.  R. E. PAGE  2,098,355
RECORD CONTROLLED MACHINE
Filed Oct. 4, 1935   5 Sheets-Sheet 2

INVENTOR
Ralph E. Page
BY
W. M. Wilson
ATTORNEY

Nov. 9, 1937.  R. E. PAGE  2,098,355
RECORD CONTROLLED MACHINE
Filed Oct. 4, 1935  5 Sheets-Sheet 4

INVENTOR
Ralph E. Page
BY
ATTORNEY

Nov. 9, 1937.   R. E. PAGE   2,098,355
RECORD CONTROLLED MACHINE
Filed Oct. 4, 1935   5 Sheets-Sheet 5
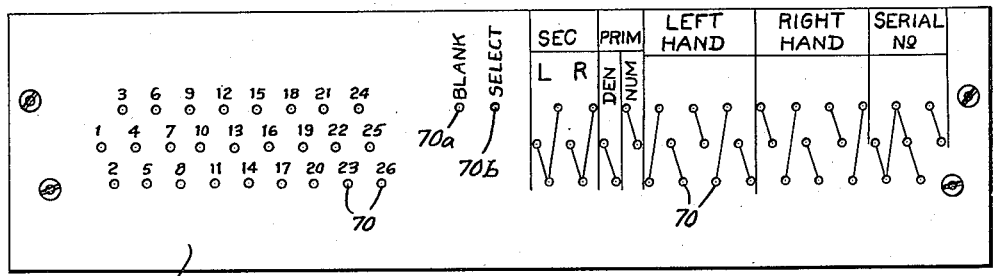
FIG. 6.
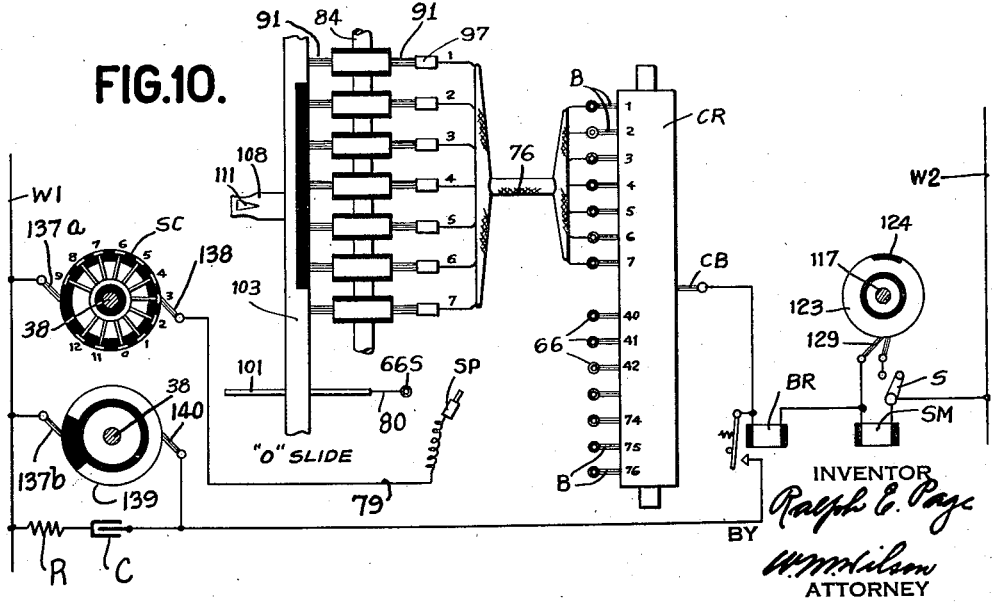

Patented Nov. 9, 1937

2,098,355

UNITED STATES PATENT OFFICE 2,098,355

RECORD CONTROLLED MACHINE

Ralph E. Page, Binghamton, N. Y., assignor to International Business Machines Corporation, New York, N. Y., a corporation of New York Application October 4, 1935, Serial No. 43,493

13 Claims. (Cl. 209—110)

This invention relates to record controlled machines in general.

The broad object of the present invention is to improve the selector device forming the subject matter of application Serial No. 758,531, filed December 20, 1934 by Ernest Rose.

An object is to greatly simplify the selector described in the Rose application so as to make it more compact, more convenient to manipulate, and reduce its cost.

Another object is to eliminate the large number of spring-actuated parts and multiplicity of contacts and other small parts disclosed in the Rose application.

A further object is to provide a closer co-ordination of the impulse emitters with the selector slides of the Rose application by combining the slides with the emitters, thereby greatly simplifying the wiring of the machine and eliminating a great many small parts.

An object is to provide a selector mechanism which eliminates the necessity for the complicated code used in punching the cards described in the Rose application.

A further object is to provide a combination plug board and analyzer unit which is removable from the machine and eliminates the brush shifting device and interchangeable brush carriers used in the Rose selector.

Various other objects, advantages, and features of the invention will be pointed out in the following description and claims, or will be apparent from a study of the description, claims, and drawings.

In the drawings:

Fig. 6 is a view of the plugboard.

Fig. 7 is a specimen card.

Fig. 8 is a fragmentary view of the graduated bars and finger pieces for the selector slides.

Fig. 10 is a wiring diagram.

Figure 1:
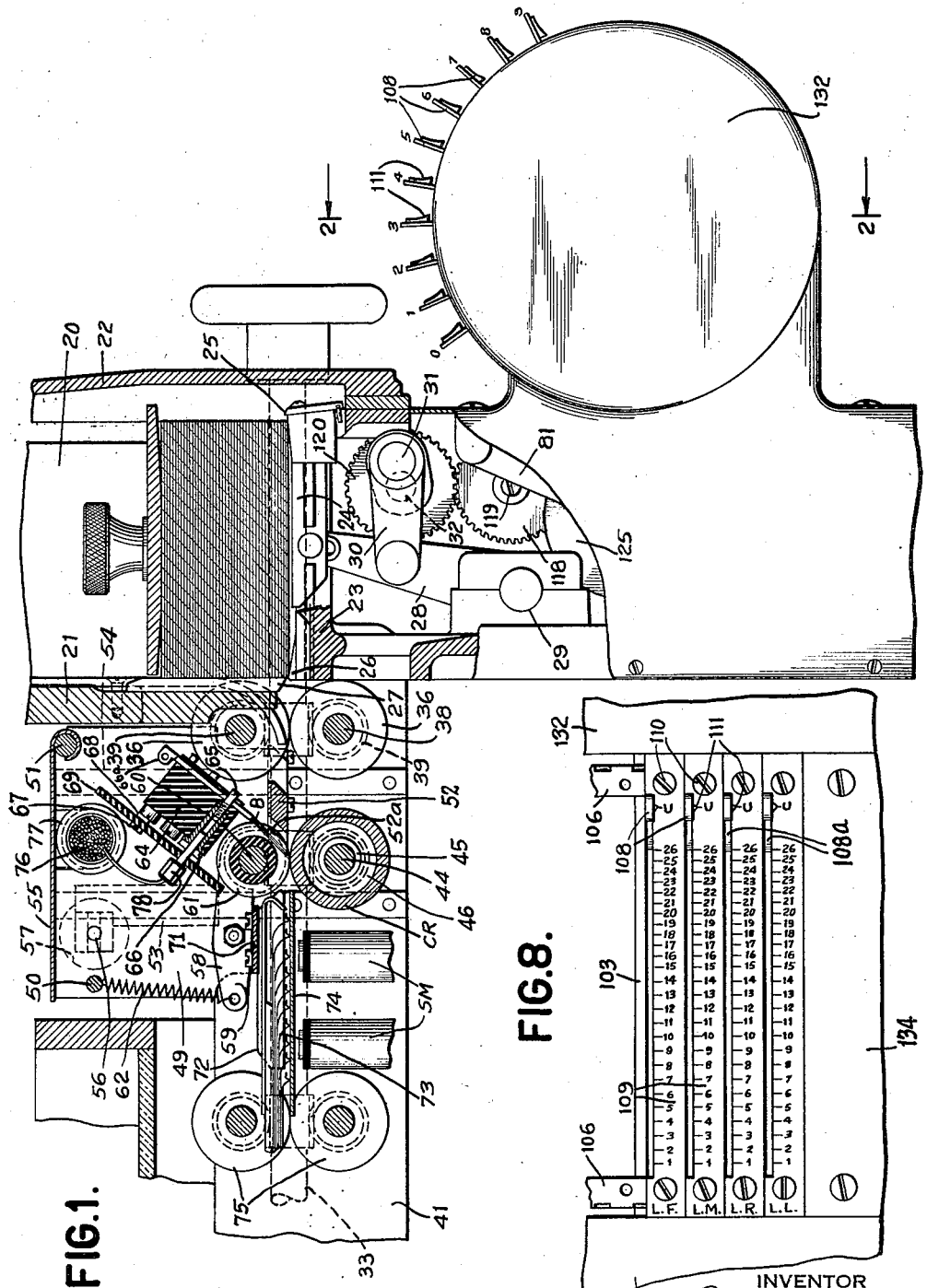
Fig. 1 is a vertical longitudinal section of the left-hand portion of the machine.

The present invention has been shown in the drawings and will be described hereinafter as applied to an "International" electric sorting machine of a type now extensively used. The basic principles of this machine and a general description of its construction will be found in Letters Patent No. 1,741,985. It will be understood, however, that the invention may be applied to other sorting machines or changed in details in order to adapt it to conditions found in practice.

Figure 2:
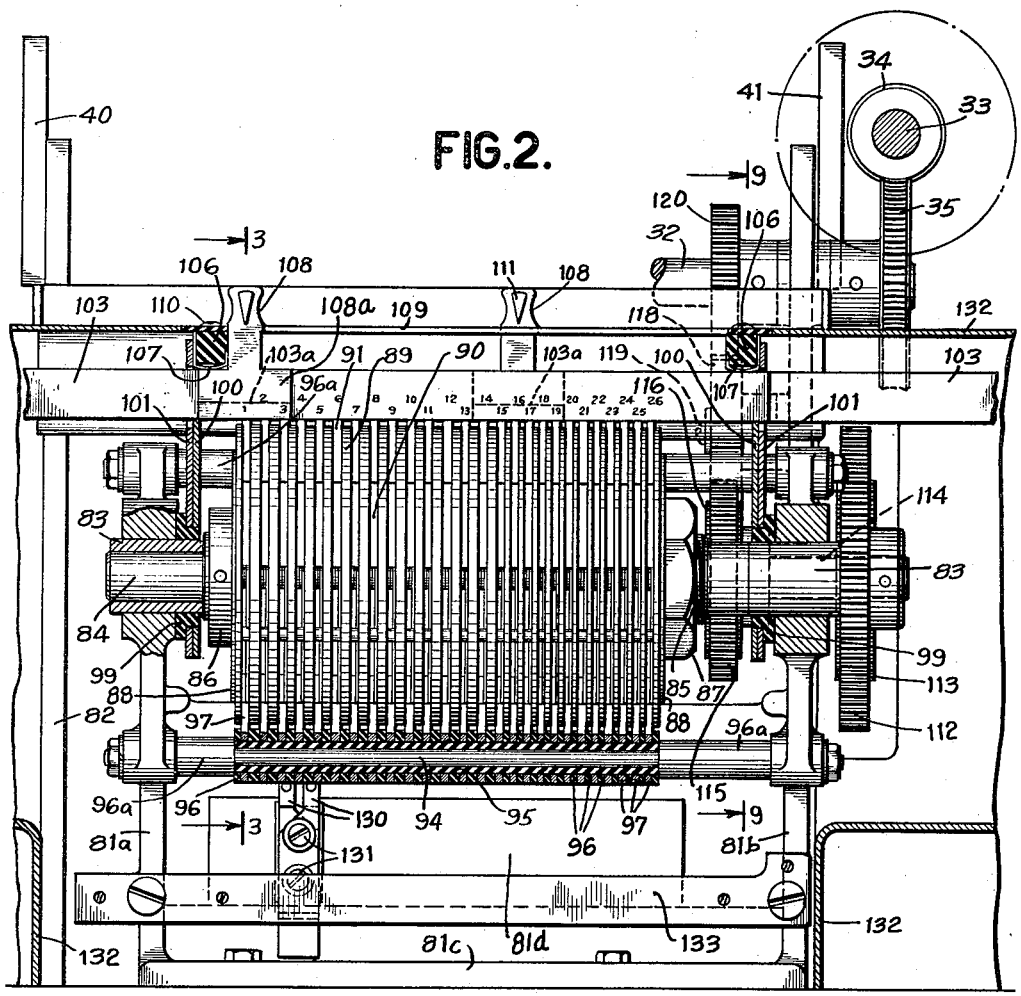
Fig. 2 is a vertical section on the line 2—2 in Fig. 1.
Figure 3:
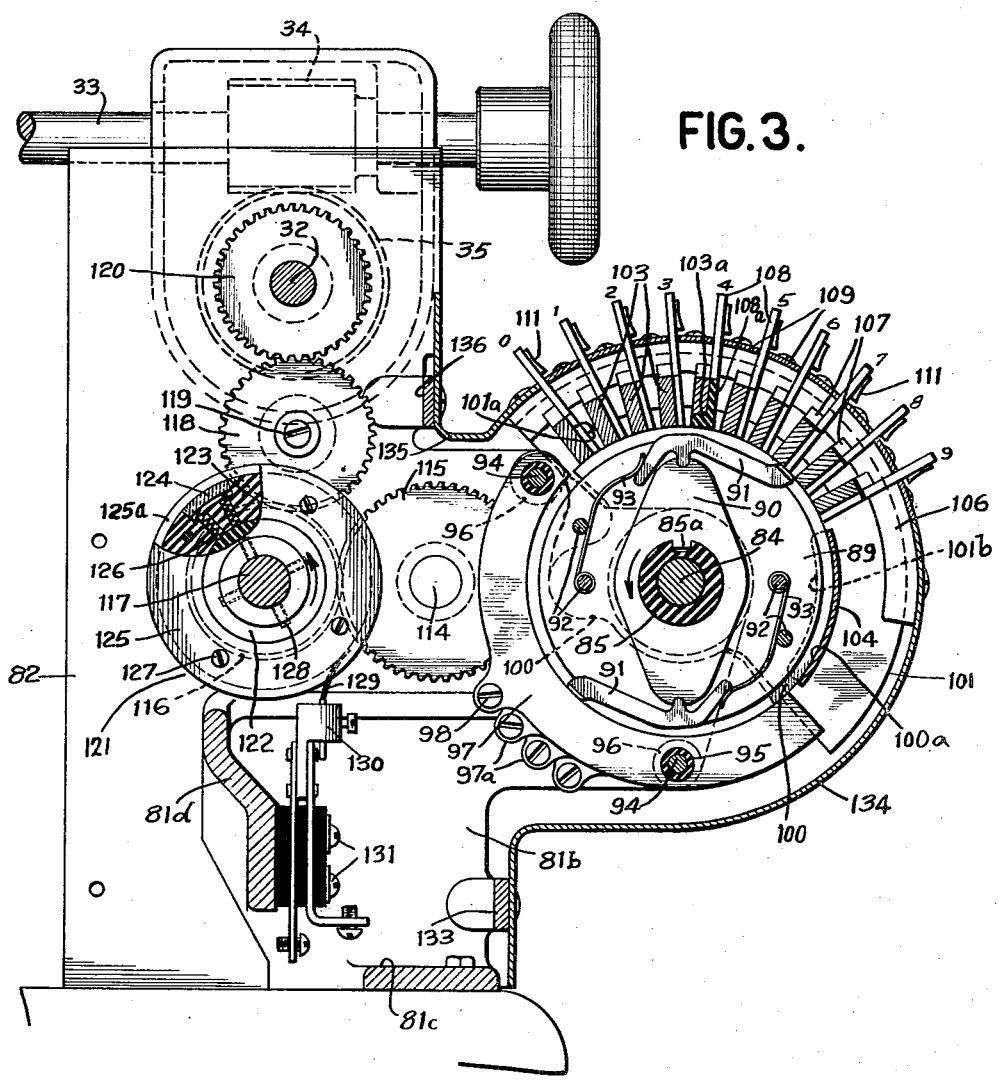
Fig. 3 is a vertical section on line 3—3 in Fig. 2.

The card hopper is composed of two end plates 20 (Fig. 1), a side plate 21, and two posts 22 secured to a casting 23 which forms the bottom of the hopper. The casting is provided with two sets of guides in which are mounted picker slides like 24 having picker knives like 25. The usual throat block 26, secured to casting 23, and a throat knife 27, secured to plate 21, are provided and are adjusted to permit removal of only one card at a time from the hopper. The slides 25 are reciprocated by means of two arms 28 secured to a cross shaft 29 and having a pin and slot connection to said slides. A link 30 connects the rearmost arm 28 to a crank 31 on the front end of a shaft 32 (Figs. 2 and 3). Shaft 32 is driven by the main shaft 33 through a worm 34 thereon and a worm wheel 35 secured to shaft 32.

Shaft 32 and crank 31 are driven by shaft 33 at the rate of one revolution per card cycle, therefore a card will be fed through the card throat, that is, the space between throat block 26 and throat knife 27, once per card cycle.

After each card has traveled a predetermined distance out of the hopper, it is gripped by a set of feed rollers 36 mounted on shafts 38 driven by shaft 33 through suitable worm gearing 39. The rollers 36 feed the cards to the left past card sensing mechanism which is arranged to sense the holes in the card and, in co-operation with the selector hereinafter described in detail, controls the distribution of the cards to the various sorting pockets. The shafts 38 are mounted in suitable bearings carried by the front rail 40 and rear rail 41, and the upper shaft is designed to have a small amount of vertical movement to ensure that the cards will be fed evenly.

Roller bearings 42 (Figs. 4 and 5), mounted in removable housings or carriers 43 secured to the rails 40, 41, support a contact roll shaft 44. Secured to shaft 44 is a pair of hubs 45 supporting insulating collars 46 on which collars is mounted a tubular metallic contact roll CR. A worm wheel 47 secured to shaft 44 meshes with a worm 48 on shaft 33. The driving ratio is such that contact roll CR turns with the same peripheral velocity as the rollers 36.

Figure 4:
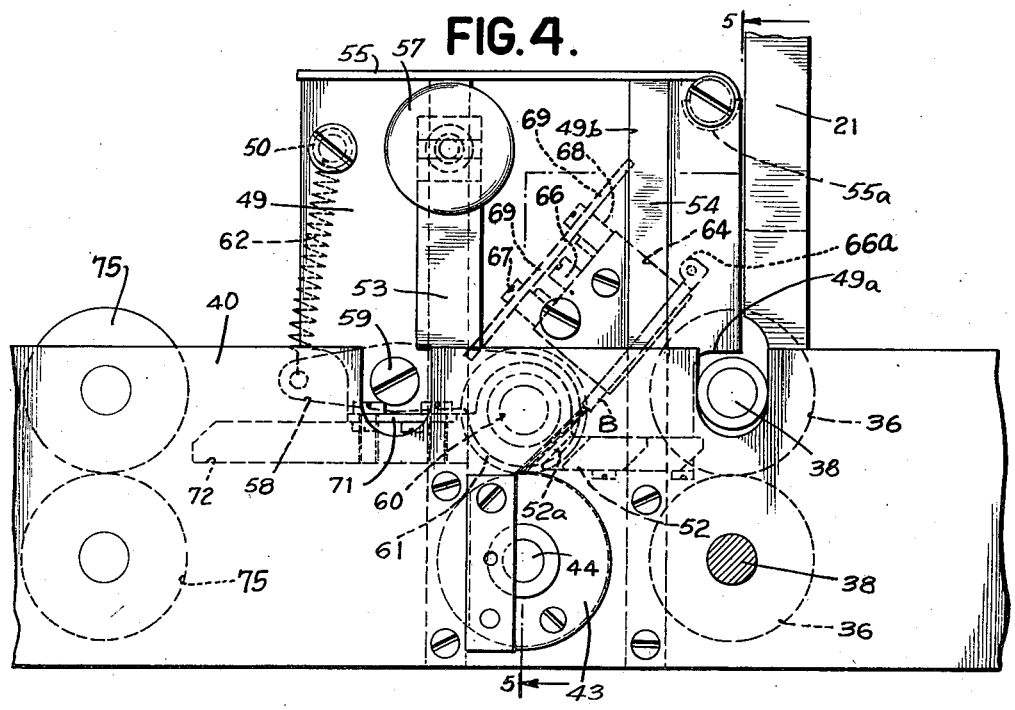
Fig. 4 is a front elevation of the card analyzing mechanism.
Figure 5:
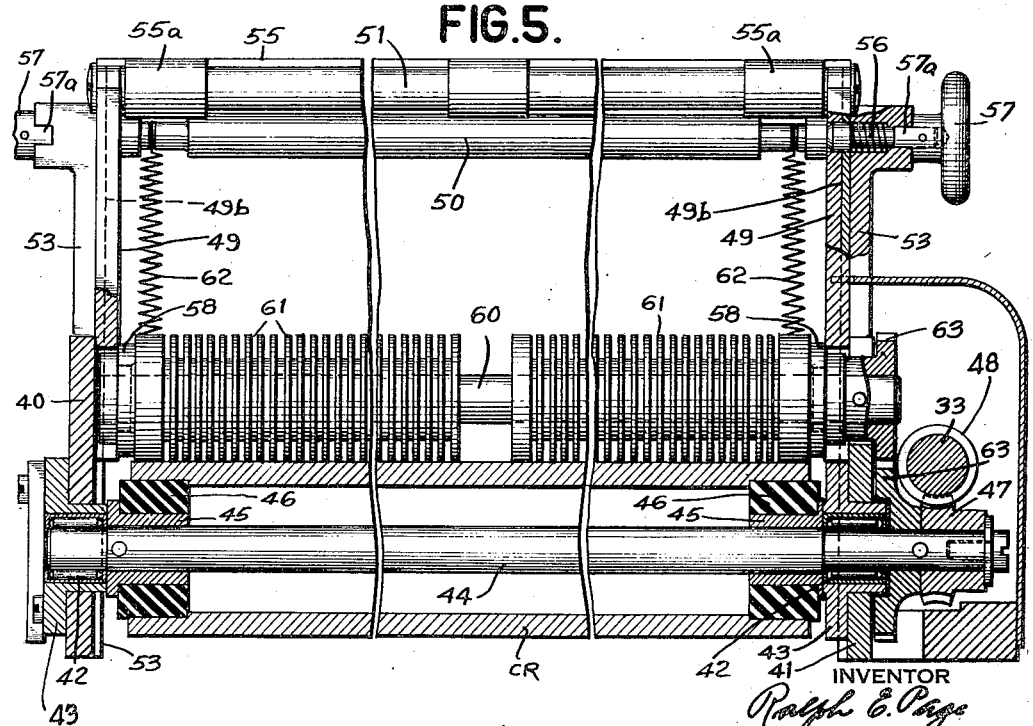
Fig. 5 is a vertical section on line 5—5 in Fig. 4.

Co-operating with contact roll CR is a removable analyzer unit. The framework of this unit comprises a pair of end plates 49 (Figs. 1, 4 and 5)

integrally joined by cross rods 50, 51 and a card guide bar 52 secured to the lower edges of plates 49, which are suitably shaped at 49a to avoid interference with the upper shaft 38.

Posts 53, 54 secured to the inside of rails 40, 41 fit vertical guide slots 49b cut in the outer faces of plates 49. A cover plate 55 is pivoted on rod 51 by means of lugs 55a (Fig. 5) formed in said plate and curved around said rod. This cover plate rests on the top edges of plates 49. The entire box-like analyzer frame assembly comprising plates 49, rods 50, 51, cover plate 55 and guide 52, as well as any parts supported by plates 49, may be removed from the machine by sliding the frame vertically on posts 53, 54.

The analyzer frame assembly is locked in place by means of spring-pressed plungers or bolts 56 which are mounted in suitable bores in the upper ends of guides 53. Thumb pieces 57 secured to bolts are provided for the purpose of withdrawing the bolts from suitable holes in plates 49 in which said bolts are seated. The thumb pieces 57 have ribs 57a seated in grooves cut in the guides 53 when the bolts are properly seated in the holes in plates 49. By withdrawing the bolts and giving thumb pieces 57 a quarter turn, the bolts are held in disengaged position permitting lifting the analyzer frame assembly out of the machine.

A pair of rock levers 58 is pivoted to the inside of plates 49 by means of screw studs 59, and journaled in the right-hand ends of these levers (Figs. 1 and 4) is a shaft 60 which extends through slots in the lower edges of the plates 49 and the upper edge of rear rail 41 so as to have a limited vertical movement relative to plates 49. Secured to shaft 60 are two feed rollers 61 made of insulating material and each is provided with a series of deep analyzer brush guiding grooves. Springs 62 anchored to rod 50 and to the left-hand ends of levers 58, cause the feed rollers 61 to be pressed down upon contact roll CR.

Gears 63 secured to the rear ends of shafts 44, 60 cause the rolls 61 to be driven with the same peripheral velocity as roll CR. Thus, the rolls CR and 61 act as feed rollers to carry the cards past the analyzing brushes.

A brush supporting bar 64 is secured to plates 49 in such fashion as to have one face sloping downwardly and toward the left in Fig. 1 in the general direction of the line of contacts of rolls CR and 61. This face is provided with as many transverse slots as there are grooves in the rolls 61 and the slots are in the same vertical planes as said grooves. Each slot in bar 64 contains an analyzing brush B which extends downwardly and to the left through one of the grooves in rollers 61 into engagement with the contact roll CR.

The brushes B are secured in their slots by means of special eyebolts 65 (Fig. 1) which are threaded into sleeves 66. The latter have slotted heads on the side of bar 64 opposite brushes B by means of which heads the eyebolts may be drawn tight to clamp the brushes B in their slots. Owing to the close spacing of the brushes, the holes for sleeves 66 are staggered to avoid danger of short-circuits or flashovers which might result if the sleeves were too close together.

Secured to the bar 64 by means of screws 67 and spacing sleeves 68 (Figs. 1 and 4) is a plugboard front plate 69 made of insulating material. As shown in Fig. 6, this plate has two series of staggered plug holes 70 which are arranged to register with the bores of sleeves 66.

The brushes B associated with the right-hand roll 61 (Fig. 5) correspond to columns 1 to 26 of the specimen punched card shown in Fig. 7. Accordingly, the left-hand series of holes 70 (Fig. 6) have been numbered 1 to 26 on plate 69 for purposes of identification. Similarly the right-hand series of holes 70 correspond to columns 40 to 76 inclusive on the card. The plate 69 may be engraved, printed, or embossed as shown in Fig. 6 to guide the operator in plugging the machine.

Two holes 70a, 70b are provided in plate 69, the hole 70a being merely a convenient receptacle for the normal sorting plug SP when the latter is not in use, while hole 70b is for the reception of the normal sorting plug when the special selector is being used. The bar 64 may be provided with a hole behind hole 70a just large enough to hold the normal sorting plug SP while behind hole 70b may be provided a sleeve and eye bolt which secure a suitable terminal lug 66a (Figs. 1 and 4) to the bar 64 instead of a brush. This terminal lug may be connected to a wire leading to the slide bar support plates of the special selector. The sleeve behind hole 70b is designated 66S in Fig. 10. It will be seen that plate 69, bar 64, and sleeves 66, 66S constitute a plug board.

The bar 52 is slotted to form narrow tongues 52a which project partly into the grooves in rolls 61 so as to permit only limited flexure of brushes B in said grooves. Thus, bar 52, co-operating with the raised portions or fins in rolls 61 hold the brushes B in alignment with the proper columns of the cards.

Secured to the lower edges of plates 49 is a cross bar 71. Secured to the underside of bar 71 is a pair of card guide blocks 72 which extend to the left parallel with the right-hand ends of the usual guide blades 73, the ends of which rest on the armature 74 of the sorting magnet SM. The guide blades 73 lead to the sorting pockets. The cards are conveyed to the sorting pockets by feed rollers like 75 driven by shaft 33. The sorting pockets are not shown in the drawings.

The magnet SM operates the guide blades 73 selectively in a well-known way which is fully explained in Patent No. 1,741,985. It will suffice to state here that if magnet SM is energized at, say the "12" position of a card cycle when a brush B senses a "12" hole in a card, such card will be conveyed to the "12" pocket whereas if not energized the card will be conveyed to the usual reject pocket. Energization of magnet SM at other points in a card cycle corresponding to holes of given values will cause the cards so punched to be conveyed to the pockets designated with the same values.

The rear plate 49 has its upper edge provided with a slot adapted to receive a cable 76 containing twenty-eight wires. Cable 76 is protected against abrasion by the edges of the plate 49 by means of a ring 77 of insulating material through which the cable passes. This ring has a circumferential groove into which the rear plate 49 fits. Twenty-six of the wires are provided with plugs 78 which are inserted in sleeves 66 behind the holes 70 of the left-hand group in Fig. 6 to connect the brushes for columns 1 to 26 to the contact segments of the special selector. Another wire 79 (Fig. 10) is provided for the normal sorting plug SP while the twenty-eight wire 80 connects the terminal lug 66a associated with sleeve 66S to the support plates for the selector slides.

The construction and operation of the special selector will be more easily understood by explaining at this point the method of punching the cards with reference to the specimen shown in Fig. 7. The finger print record sheets on which the finger prints of an individual, his or her photograph, and particulars of the individual's character, physical characteristics, and other data are recorded, are designated with a serial number. There is a card like the one shown in Fig. 7 for each finger print record sheet which card is punched in the right-hand half to record the finger print classification data and the serial number of the record sheet. In the left-hand half of the card is recorded the ridge count of each finger.

The Rose application Serial No. 758,531 describes a method of coding the ridge count which necessitated a rather intricate selector with a complex wiring system. The present invention aims to provide a much simpler method of recording the ridge count in the cards in order to reduce the number of working parts and greatly simplify the wiring. In the selector device hereinafter described, the much simpler way of recording the ridge count makes the wiring of the machine extremely simple, requiring little more wiring than the cable 76 in addition to the usual wiring of simple sorting machines.

The ridge count of a given finger is recorded by punching a single hole in one of the columns 1 to 26 in the index point position corresponding to that finger. Thus, in the specimen card of Fig. 7, the row of "0" index point positions represents the right thumb and a count of four ridges is recorded by punching a hole in the "0" position of column 4.

Similarly, a ridge count of eight for the right first finger is recorded by punching a hole in the "1" position of column 8, and so on. When a record sheet lacks a print of a given finger, by reason of inability to secure one, or identify it with any degree of certainty, a hole is punched in the 27th column headed "Unknown". The great majority of the record sheets will be complete as to prints since they will be furnished by police officers, prison wardens, or voluntarily by the individuals themselves, and in such cases all prints will appear or be accounted for as by amputation. On the other hand, quite a few sheets will have one or more finger prints missing due to the fact that the "wanted" criminal is unknown and has only left one or two prints at the scene of the crime or on personal articles handled by the criminal.

The special selector mechanism is mounted in a unitary frame casting comprising sides 81a, 81b which are joined by a bottom cross bar 81c and a stiffening bar 81d. As shown in Fig. 2, this frame casting is mounted between and below the rails 40, 41 and between the frame castings 82 which support the hopper parts. The sides 81a, 81b extend to the right (Fig. 3) well beyond frames 82 and are provided at their right-hand ends (Figs. 2 and 9) with bushings 83 which support a shaft 84.

Mounted on shaft 84 between the sides 81a, 81b of the frame casting is a tube 85 of insulating material which has a key-way 85a (Fig. 3) cut therein. The left-hand end (Fig. 2) of tube 85 is provided with a metal collar 86 and this collar and the tube 85 are secured to shaft 84 with a single pin. The opposite end of tube 85 is threaded to receive a nut 87. Clamped between collar 86 and nut 87 by means of the latter is an assemblage of parts consisting of two metallic end discs 88, twenty-seven discs 89 of insulating material, and twenty-six metallic brush carriers 90. The discs 89 are separated by the brush carriers 90 and these parts, as well as the end discs 88 all have tongues or keys formed therein which project into the key-way 85a in tube 85. The first fourteen discs 89, beginning with the second from the left in Fig. 2, are slightly thicker than the remaining twelve at the right whereby the first fourteen brush carriers 90 are spaced slightly farther apart than the remaining twelve. The purpose of this construction will be explained hereinafter.

The brush carriers 90 are so shaped as to provide two rows of arms extending on diametrically opposite sides of shaft 84 and with the arms of each row in axial alignment. Each arm has a semi-circular notch in which loosely fits a fulcrum lug formed in a flat brush or contact shoe 91 so that the shoes have pivotal movement in planes transverse of the shaft 84 and are guided by discs 89. The shoes 91 are slightly thinner than the carriers 90 to permit free pivotal movement of the shoes between discs 89. Preferably the carriers 90 are made of tempered steel while the shoes 91 are made of beryllium copper.

The discs 89 support four rods 92, a pair of which is associated with each row of shoes 91. One rod of each pair acts as a stop for bow springs 93. One end of each spring is looped around the other rod of the pair, while the free end of the spring bears on the tail of one of the contact shoes 91 in such fashion as to tend to move the free end outwardly away from the shaft 84. The free ends of shoes 91 are curved radially away from shaft 84 and are slightly chamfered.

A pair of rods 94 are secured in the sides 81a, 81b of the frame casting and extend parallel with shaft 84. Insulatably mounted on the rods 94, as by means of long tubes 95 and spacing collars 96 of insulating material, are twenty-six semi-circular contact segments 97, preferably made of hard brass. The collars 96 are made in two widths (Fig. 2) to compensate for the two different thicknesses of discs 89 and are arranged to space segments 97 in the planes of shoes 91. The inner edges of segments 97 are concentric with shaft 84 and have a slightly greater radius of curvature than discs 89. Springs 93 press shoes 91 in contact with the inner edges of segments 97 so that said shoes wipe over said segments as the shaft 84 revolves. The segments 97 have terminal lugs 97a which are staggered to provide room for terminal screws 98 by means of which the twenty-six wires of cable 76, corresponding to the brushes B sensing columns 1 to 26 of the cards, are connected to said segments. In Fig. 2, the small numerals 1 to 26 appearing directly above the top row of shoes 91 indicate the columns of the cards with which the pairs of shoes 91 and segments 97 correspond.

It will be apparent from what has been said regarding the two thicknesses of discs 89 that the pairs of shoes 91 corresponding to columns 1 to 14 are spaced further apart than the pairs of shoes for columns 15 to 26. The assemblage of parts on rods 94 comprising tube 95, collars 96, and segments 97 are spaced from the sides 81a, 81b of the frame casting by two short sleeves 96a of suitable lengths.

Figure 9:
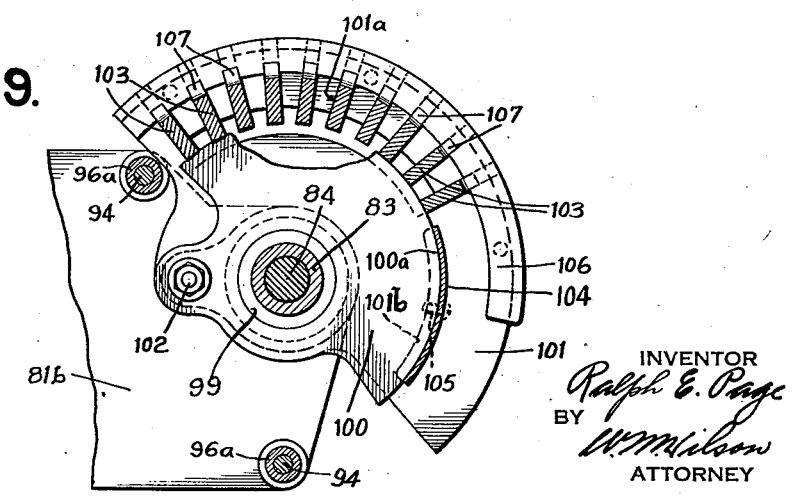
Fig. 9 is a vertical section on line 9—9 in Fig. 2.

Mounted on the inner ends of bushings 83 adjacent the sides 81a, 81b of the frame casting are two shouldered washers or collars 99 of insulating material (Figs. 2 and 9). The shoulder of each of these collars 99 supports a pair of guide segments 100, 101 which are insulatably secured against rotation on collars 99 by means of bolts 102 (Fig. 9) and suitable insulating collars and washers, the bolts 102 passing through holes in the sides 81a, 81b of the frame casting. The guide segment 101 has a series of ten guide slots 101a disposed in an arc with shaft 84 as a center and radiating from said shaft to form a guide comb. Segment 100 has a smooth arcuate guide edge 100a concentric with shaft 84 and of the same radius as the inner edges of segments 97. Supported by the edge 100a and guided by the slots 101a are ten selector slides 103 which act both as commutator bars and as a means for manually setting the selector to select predetermined cards.

Each slide 103 corresponds to all of the index point positions of a given value in columns 1 to 26 of the specimen card shown in Fig. 7 as indicated by the small numerals 0 to 9 in Fig. 3. Thus there is a single slide 103 common to the "9" positions, another for the "8" positions, and so on. It will be evident from Fig. 7 that the slides 103 also correspond to the fingers of both hands. The edges of slides 103 nearest shaft 84 act as contact surfaces over which shoes 91 wipe as shaft 84 rotates, and it is for this reason that the edges 100a in segments 100 are made of same radius as the inner edges of segments 97. The edges of slides 103 contacted by shoes 91 are spaced close enough to prevent the chamfered ends of the shoes from catching on the sides of said slides.

The guide segments 101 are provided with arcuate slots 101b (Figs. 3 and 9) concentric with the edges 100a of the adjacent segments 100. A curved plate 104, whose inner curved surface is concentric with edges 100a and of the same radius, projects through the slots 101b and is held in firm contact with edges 100a by the outer edges of slots 101b. The shoes 91 wipe over the inner surface of plate 104 which serves as a guide to prevent movement of said shoes outwardly relative to shaft 84 after the shoes have passed from contact with segments 97 and before the shoes engage the "9" slide 103. This plate 104 is prevented from sliding transversely of the segments 100, 101 by means of two screws 105 which are threaded into holes in said plate adjacent segments 101 and whose heads engage the sides of guides 101. The rear screw 105 also acts as a terminal screw to which the wire 80 leading to sleeve 66S is connected.

Secured to the outer edges of the segments 101 are arcuate members 106 of insulating material. The sides of members 106 adjacent segments 101 are provided with ten shallow rectangular slots which are co-radial with the slots 101a. The inner curved surfaces of members 106 are provided with similar slots opposite and parallel with the slides 103. In these slots are located L-shaped springs 107 made of flat ribbon which bear against the sides of the adjacent guide 101 and also press down upon the corresponding slides 103. The parts of the springs 107 which engage slides 103 are also turned upwardly to loosely engage the sides of members 106 opposite segments 101. The springs 107 ensure proper electrical contact between slides 103 and segments 100, 101. The plate 104 also electrically connects segments 100, 101 from which it will be apparent that the slides 103 are all connected to the sleeve 66S.

Secured to each slide 103 is a finger piece 108 (Figs. 2 and 3) shaped like an inverted T. The cross-bar 108a of the T has an offset portion which fits snugly in a rectangular notch or recess 103a cut transversely of slide 103. This construction is illustrated by the "4" slide in Fig. 3. The bottom surface of the cross-bar 108a is flush with the lower edge of the slide 103 and is adapted to be wiped by the shoes 91. The cross-bar 108a is long enough to insulate the shoes 91 associated with five of the columns 1 to 14 and seven of the columns 15 to 26. As an illustration, the "9" slide 103 can be positioned so that at the "9" point in each card cycle the shoes 91 associated with columns 1 to 5 of the card will be insulated. With a different setting the shoes of columns 15 to 21, for example, will be insulated.

A series of graduated bars 109 are secured to the members 106 by means of screws 110 (see Fig. 8). These bars are shaped to provide a narrow slot through which the finger pieces 108 project. Each finger piece 108 has an index 111 which cooperates with a scale of numbers ranging from 1 to 26 engraved, printed, or embossed in the adjacent bar 109. The numbers read from left to right in Fig. 8 to correspond with the same numbers in Fig. 2 and the spacing of the graduations on bars 109 opposite the numbers in Fig. 8 corresponds to the spacing of discs 89 in Fig. 2.

The following table shows how the finger pieces insulate the shoes 91 when set opposite the different numbers on the graduated bars:

*Table I*

| Position of slide 103 | Shoes 91 insulated in following columns |
|---|---|
| 1 | 1, 2, 3 |
| 2 | 1, 2, 3, 4 |
| 3 | 1, 2, 3, 4, 5 |
| 4 | 2, 3, 4, 5, 6 |
| 5 | 3, 4, 5, 6, 7 |
| 6 | 4, 5, 6, 7, 8 |
| 7 | 5, 6, 7, 8, 9 |
| 8 | 6, 7, 8, 9, 10 |
| 9 | 7, 8, 9, 10, 11 |
| 10 | 8, 9, 10, 11, 12 |
| 11 | 9, 10, 11, 12, 13 |
| 12 | 10, 11, 12, 13, 14 |
| 13 | 11, 12, 13, 14, 15 |
| 14 | 12, 13, 14, 15, 16 |
| 15 | 13, 14, 15, 16, 17, 18 |
| 16 | 14, 15, 16, 17, 18, 19 |
| 17 | 15, 16, 17, 18, 19, 20 |
| 18 | 15, 16, 17, 18, 19, 20, 21 |
| 19 | 16, 17, 18, 19, 20, 21, 22 |
| 20 | 17, 18, 19, 20, 21, 22, 23 |
| 21 | 18, 19, 20, 21, 22, 23, 24 |
| 22 | 19, 20, 21, 22, 23, 24, 25 |
| 23 | 20, 21, 22, 23, 24, 25, 26 |
| 24 | 21, 22, 23, 24, 25, 26 |
| 25 | 22, 23, 24, 25, 26 |
| 26 | 23, 24, 25, 26 |

When any of the slides 103 are moved as far to the right (Fig. 8) as they will go, the indexes 111 of these slides will register with the letters "U" on the graduated bars 109 and none of the shoes 91 will be insulated when they wipe across these bars.

The graduated bars have at their left-hand ends (Fig. 8) initials which designate the fingers of each hand. Thus the initials "L. L.", "L. R.", "L. M.", and "L. F." designate the little, ring, middle, and first fingers, respectively, of the left-hand and the slides 103 associated with these bars correspond to the "9", "8", "7", and "6" index-point positions in the card columns. The remaining bars 109 are similarly initialed in the order shown in Fig. 7 by the finger names.

It is apparent that the finger pieces 108 have dual functions, that is, they not only provide a means for moving the slides by hand but also provide a convenient means for insulating the shoes 91 in groups. While it is convenient to make the finger pieces 108 as shown in the drawings, other forms could be used. For instance the finger pieces and slides could be an integral metal stamping with a separate insert of insulating material and a layer of insulating material molded about the finger piece, or alternately, finger pieces and inserts could be made of separate pieces independently secured to the slides in various ways. For these reasons it is not desired to be limited to a finger piece of the form shown in the drawings.

A large gear 112 (Fig. 2) is secured to the rear end of shaft 84 and meshes with a smaller gear 113 secured to the rear end of a short shaft 114 journaled in the side 81b of the frame casting. A similar gear 115 secured to the front end of shaft 114, meshes with a gear 116 on a shaft 117 which is journaled in the sides 81a, 81b of the frame casting. Gear 117 meshes with an idler gear 118, journaled on a stud 119 carried by the side 81b, which gear 118 meshes with a gear 120 secured to the shaft 32. The driving ratio of the gearing is such that shaft 117 turns at the rate of one revolution per card cycle while shaft 84 turns only a half revolution in the same time. The directions of rotation are indicated by arrows in Fig. 3.

A commutator 121 (Fig. 3) is secured to shaft 117 and consists of a hub 122 on which is pressed a steel ring 123. The latter has a slot in which is loosely mounted a glass insert 124 which is held against radial and axial movement by a pair of rings 125 of insulating material, the rings 125 having beads 125a which overlap the edges of ring 123 and the insert 124. Springs 126 located in two radial holes in the ring 123 pass the glass insert radially against beads 125a. The outer surface of the insert 124 is curved to conform to the outer surface of ring 123. Screws 127 secure rings 125 to the sides of the steel ring 123 while four set-screws 128 secure the hub 122 to shaft 117.

A pair of brushes 129 both bear on the periphery of ring 123 between the beads 125a on rings 125. The brushes 129 are mounted in brush holders 130 both of which are insulatably mounted on the bar 81d by means of two screws 131. The commutator 121 is so timed with relation to brushes 129 that current can flow at all points in the cycle except at the "12" position and for a very brief period thereafter.

The selecting mechanism is mounted in a suitable case consisting of end pieces 132 (Figs. 1 and 3), secured to the frame castings 82 supporting the hopper and to a bar 133 mounted on the sides 81a, 81b, and a pair of center pieces 134, 135 (Fig. 3). One center piece 134 is secured to bar 133 and the members 106 while the other center piece 135 is also secured to members 106 and to a bar 136 carried by the sides 81a, 81b of the frame casting. The end pieces 132 are also secured to bar 135.

The usual single column selecting commutator is designated SC in Fig. 10 and is substantially the same as the one described in Patent No. 1,741,985. The common brush 137a of this commutator is connected to line wire W1, while the brush 138 bearing on the individual segments is connected to wire 79 leading to the normal sorting plug SP. The usual holding segment for commutator SC is designated 139 in Fig. 10 and has a brush 140 connected to the contacts of the usual brush relay BR and a common brush 137b connected to line wire W1. Brushes 137a, 137b are in reality a single brush in the machine as built, but this single brush has been shown as two brushes in Fig. 10 to facilitate tracing circuits. The coil of brush relay BR is connected to the usual contact roll common brush CB. Neither the selecting commutator SC nor the brush CB have been shown in Figs. 1 and 4 as their construction is well-known. The commutator SC is usually mounted on the front end of the lower feed roll shaft 38 in Fig. 4.

The commutator 121 shown in Fig. 3 is connected to shunt the sorting magnet SM through switch S for all index-point positions, except the "12" position, provided switch S (Fig. 10) is closed. In order to reduce arcing of brush 140, there is provided a resistance R and a condenser C.

Normal sorting operations may be effected by opening switch S (Fig. 10) and inserting the sorting plug SP in the appropriate one of columns 40 to 76. Suppose it were desired to sort the cards into serial order. Plug SP would be pushed into the hole 70 corresponding to the column 76 far enough to enter the sleeve 66 for the brush B of column 76. The cards would be placed in the hopper face up with the "9" positions at the left (Fig. 1). All of the segments of commutator SC would be made current conducting and the machine started in the usual way.

When the brush B for column 76 encounters a hole in said column, say a "5" hole, the following circuits will be established at the "5" point in the cycle. Line wire W1, brush 137a, the "5" segment of commutator SC, wire 79, brush B for column 76, contact roll CR, brush CB, relay BR, and sorting magnet SM, to line wire W2. The sorting magnet SM is thus energized at the "5" position, causing the card so punched to be conveyed to the "5" pocket. Energization of relay BR causes its contacts to establish the usual holding circuit to line wire W1 through brushes 137b, 140 and segment 139 which circuit is broken after the "12" position.

The number of ridges appearing in finger prints that have been made casually or accidentally is likely to vary due to variations in the pressure exerted by fingers in handling things or touching walls, furniture, etc. In preparing finger print record sheets at prisons and other places where the persons whose prints are desired is available, the prints are made with printer's ink under ideal conditions to bring out clearly every characteristic of the fingers. This is not so of prints found at the scene of a crime or on articles handled or touched by a criminal or suspected person. This fact must be borne in mind in searching for record sheets corresponding to a specimen set of prints. The selector mechanism shown in Figs. 2 and 3 has been designed to select not merely all cards having exactly the same ridge count as are counted in the specimen prints, but also all other cards having ridge counts a predetermined amount higher and lower than the specimen prints.

Experienced finger print officers sometimes disagree in respect to the ridge count due to peculiarities in the ridges making it difficult to decide exactly where the "delta" or outer terminus of a loop or whorl is located. Errors in counting ridges result from the condition of the prints, the closeness of spacing of the ridges, and other causes. As a rule the larger the number of ridges between termini the greater are the chances of error. It is for this reason that the selector herein described is designed to select not only all cards having exactly the same ridge counts but all others within a predetermined range amount above and below each ridge count. Due to the greater chances of error when the ridge count has a high value, the selector is designed to vary the range of selection so that the ranges of selection for the higher values are greater than the ranges for lower values.

In the case of a casual print showing a ridge count of 12, it is advisable to compare this print with the record sheets showing counts of 10, 11, 13, and 14 for the same finger. On the other hand, a ridge count as fine as 22 on a specimen print, requires that sheets showing counts of 19, 20, 21, 23, 24, 25 for the same finger be compared with the specimen.

Table I given above shows how the selections are made for each ridge count. In the case of ridge counts ranging 1 to 14, for each ridge count, all others two above and two below the predetermined count are selected at the same time, except in the case of the counts 1 and 2. In the case of ridge counts of 15, 16, 17, the cards showing counts of three above and two below are selected. This is due to the change in the spacing of shoes 91 which occurs between columns 15 and 16 in Fig. 2. Counts of 18 to 26 result in selecting all cards three above and three below the predetermined count, except in the case of the counts 24, 25, and 26 in which less than three above are selected for obvious reasons.

It will be assumed that a set of ten prints are available which were taken from articles handled by a suspected person and it is desired to identify this person; ascertain his past record, physical characteristics, etc.; and obtain his photograph. A card is punched like the one shown in Fig. 7 and the selector is set to agree with the ridge counts punched in the card. The "0" slide 103 must be set to the column 4 position, the "1" slide to the column 8 position, and so on. The cards are placed in the hopper face up with the "9" positions at the left (Fig. 1). Plug SP is pushed through the hole 70b corresponding to the sleeve 66S, and switch S is closed. Commutator SC is made current conducting in all positions and the machine started in the usual way.

Let it be assumed that a card punched exactly like the specimen shown in Fig. 7 is sensed by the brushes B. At the "9" position in the cycle one of the two shoes 91 corresponding to column 5 will be insulated by the finger piece of the "9" slide 103 and no circuit can be established at the "9" point. The same will be true with respect to column 7 at the "8" point, and so on for the remaining points in the cycle. Thus, sorting magnet SM will not be energized and the card will be conveyed to the usual reject pocket. If now a card is sensed which has a hole in any of the following columns of each index-point position, exactly the same thing will take place:

*Table II*

| Position | Columns |
|---|---|
| 0 | 2, 3, 5, 6 |
| 1 | 6, 7, 9, 10 |
| 2 | 10, 11, 13, 14 |
| 3 | 1, 2, 4, 5 |
| 4 | 5, 6, 8, 9 |
| 5 | 3, 4, 6, 7 |
| 6 | 7, 8, 10, 11 |
| 7 | 9, 10, 12, 13 |
| 8 | 5, 6, 8, 9 |
| 9 | 3, 4, 6, 7 |

The reason for this action is that setting the slides 103 has the effect of insulating the shoes 91 not only in the columns and index-point position corresponding to the punched holes in Fig. 7, but also in the same positions of two or three adjacent columns.

For instance, setting the "0" slide 103 to the column 4 position has the effect of insulating the shoes 91 corresponding to columns 2, 3, 5, 6 at the "0" position. This is illustrated in Fig. 10 which shows the relationship of the finger piece for the "0" slide 103 to the shoes 91 of columns 2 to 6, inclusive.

The cards will be rejected as described above even when they do not agree in any particular with the card shown in Fig. 7, as long as the hole in each position appears in any of the columns prescribed for such position in Table II. Thus, a card having holes punched as indicated by the following table would be rejected.

*Table III*

Position _____ 0—1— 2—3—4—5—6— 7—8—9
Column _____ 6—9—10—2—9—6—7—12—8—3

Now let it be assumed that a card is sensed having one or more holes not conforming to the positions and columns prescribed in Table II, but punched as follows:

*Table IV*

Position__ 0— 1—2— 3— 4— 5— 6—7— 8— 9
Column __ 7—11—9—16—21—10—15—5—20—19

At the "9" point in the cycle, the "9" hole in column 19 will establish a circuit through relay BR since only the shoes 91 associated with columns 3 to 7, inclusive, are insulated at the "9" point. This circuit is traced as follows: Line wire W1, commutator SC through "9" segment, wires 79 and 80, segments 100 and 101, the "9" slide 103; shoes 91, their carrier 90, and contact segment 97 of column 19; cable 76, brush B of column 19, contact roll CR, brush CB; relay BR, switch S, and the brushes 129 and ring 123 of the commutator 121, to line wire W2.

Relay BR through closure of its contacts establishes the usual holding circuit for said relay through segment 139 and brushes 137b, 140 to line wire W1. The commutator 121 keeps the sorting magnet shunted until the "12" position where the insert 124 is effective to break the shunt and permit energization of the sorting magnet. As a result the card punched as shown in Table IV will be conveyed to the "12" pocket.

Any card punched in one or more of the columns and positions indicated by the following table will also be conveyed to the "12" pocket:

*Table V*

| Position | Columns |
|---|---|
| 0 | 1 and 7 to 26 |
| 1 | 1 to 5, and 11 to 26 |
| 2 | 1 to 9, and 15 to 26 |
| 3 | 6 to 26 |
| 4 | 1 to 4, and 10 to 26 |
| 5 | 1, 2, and 8 to 26 |
| 6 | 1 to 6, and 12 to 26 |
| 7 | 1 to 8, and 14 to 26 |
| 8 | 1 to 4, and 10 to 26 |
| 9 | 1, 2, and 8 to 26 |

It usually happens that a complete set of ten finger prints is not available, as criminals are seldom so careless as to leave complete sets of prints at the scenes of their crimes. Suppose the card in Fig. 7 represents the finger print record sheet of a convicted person who, after serving a term in one part of the country, commits a crime in another part of the country and is careless enough to leave identifiable prints of eight fingers at the scene of the crime. The available prints would be classified by finger print experts and the ridge counts noted. Assume that the prints of the little fingers are missing.

The slides 103 for all except the "4" and "9" positions will be set in accordance with the ridge counts of the eight specimen prints and commutator SC will be made non-current conducting in the "4" and "9" positions. This procedure is necessary because the card shown in Fig. 7 will be located somewhere in the file of cards and the presence of "4" and "9" holes in this card would cause it to be sent to the "12" pocket instead of the reject pocket where it belongs. In other words the desired card would not be found as only the cards falling in the reject pocket are of interest.

With this arrangement all cards having the same or nearly the same ridge counts recorded by holes in the positions 0 to 3 and 5 to 8 will be conveyed to the reject pocket in spite of the fact that all or some of these cards have holes in the "4" and "9" positions of columns other than 5 and 7 in Fig. 7.

Conversely, it may happen that a criminal operating under an assumed name, and suspected of being an old offender, is arrested for a crime and found to have a physical deformity such as two fingers grown together or a finger obviously missing from childhood. In this case, the commutator SC would not be set to non-conducting position for the missing finger because all previous records of this criminal will show a missing finger. The slide 103 for the finger known to be missing will be set to the "U" position whereby none of the shoe 91 will be insulated in the position corresponding to this slide. For instance, the lack of a left-hand little finger from birth would require that the "9" slide 103 be set to the "U" position.

With this setting of the machine a card having a hole in the "9" position of any column will be conveyed to the "12" pocket where it belongs because it is obvious that the record sheet which this card identifies could not possibly belong to the arrested criminal.

The cards falling in the reject pocket are studied and many may be eliminated immediately upon inspection due to disagreements in classification so as to leave only a relatively small number of cards of which the record sheets must be removed from the files for careful study and comparison with the specimen prints.

When a finger or hand is found to have been amputated, the missing fingers are treated as unknown by setting the commutator SC to non-conducting position as explained above. This is necessary because the amputation may have been performed since the preparation of the record sheet in the files.

While there has been shown and described and pointed out the fundamental novel features of the invention as applied to a single embodiment, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A selecting commutator for record controlled machines comprising a series of rotatable contact devices; a series of slides manually movable transversely of the plane of rotation of the contact devices, said slides being arranged in an arc and wiped by the contact devices during their rotation; and means on the slides and movable therewith for preventing electrical contact with a predetermined number of the contact devices.

2. A selecting commutator for record controlled machines comprising a series of rotary contact elements; a series of slides movable transversely of the planes of rotation of the elements, said slides acting as commutator bars over which said elements wipe periodically; and means on said slides for insulating a predetermined number of said elements during their rotation.

3. A selecting device for record controlled machines comprising a series of contact bars, a series of contact devices movable transversely of the bars, and means on said bars whereby selective longitudinal movement of the bar transversely of the direction of movement of the contact devices insulates a predetermined number of the contact devices while leaving the others uninsulated.

4. A selector device for record controlled machines comprising a series of longitudinally movable selector slides each having an insert of insulating material of predetermined length; a series of contact devices wiping over said slides and the inserts transversely of the longitudinal axis of the slides, each of said inserts being operative to insulate a predetermined group of the contact devices when the latter wipe over the corresponding slide; graduated plates for each slide, and means connected to the slides and co-operating with the graduated plates whereby the slides may be manually set to different values.

5. A selecting commutator for record controlled machines comprising a drive shaft, a pair of arcuate guide combs concentric with said shaft; a series of commutator bars slidably mounted in said combs for movement longitudinally of said shaft, said bars having portions thereof provided with insulating inserts of predetermined length; a series of rotary contact devices mounted on said shaft and adapted successively to wipe over said bars and the inserts as the shaft rotates, and means including a scale of values and an index for variably moving the bars longitudinally to bring the inserts into co-operation with predetermined groups of contact devices.

6. A finger print selecting commutator comprising a series of longitudinally movable slides each corresponding to one of the fingers of a hand, a scale and index for each slide whereby the slides may be variably set according to the ridge counts on the fingers of both hands; a series of contact devices adapted to wipe over the slides in serial order transversely of their longitudinal axis, each contact device corresponding to a different ridge count; and means on each of the slides for insulating a group of the contact devices corresponding to a predetermined group of ridge counts whereby the setting of a selected slide to a predetermined ridge count insulates not only the contact device corresponding to such ridge count but also to a predetermined number of additional contact devices corresponding to ridge counts closely related to the predetermined ridge count.

7. In a machine controlled by records wherein a predetermined group of columns correspond to ridge counts and the index-point positions correspond to the fingers of both hands, a series of longitudinally slidable commutator bars corresponding to the index-point positions of a record, a series of wiper elements each corresponding to a different record column and ridge count and adapted to wipe over the bars in succession, a series of analyzing brushes connected to said wiper elements and adapted to sense holes in the group of columns representing the ridge count, and means on the bars whereby a predetermined number of the wiper devices will be insulated when the bars are longitudinally selectively set.

8. In combination with the main framework of record controlled machine such as a sorting machine, guides mounted in said frame; and a removable analyzer unit mounted in said guides, said unit comprising a pair of side plates, a pair of rock arms mounted in said plates, a feed roll rotatably mounted in said arms, and having a series of peripheral slots, spring means to rock said arms whereby to press the feed roll into contact with a record passing by said feed roll, a brush support bar mounted in said plates, a series of analyzing brushes disposed along said bar adjacent the slots in the feed roll and projecting through said slots into contact with the record, means to secure the brushes to said bar including a series of members having bores, and a plug board plate having a series of holes registering with said bores whereby plugs may be inserted in said members through said holes in the plug board plate.

9. A selector for sorting machines and the like comprising a series of rotary contact devices; a longitudinally movable bar extending transversely of the contact devices whereby the contact devices wipe over said bar at least once during their rotation to make electrical contact with said bar, means on said bar for preventing electrical contact between said bar and a pre-determined number of said devices, and means to move the bar longitudinally to vary the number of electrical contacts of said devices with said bar.

10. A group selecting commutator for record controlled machines comprising a series of selector bars disposed in fan-shaped relation, each corresponding to an index-point position of a record to be selected and movable longitudinally; a series of rotary wipers adapted to successively move over the bars transversely, each of said wipers corresponding to a column of the record, and means on said bars whereby a variable number of said wipers may be insulated by selectively moving the bars longitudinally.

11. A group selecting commutator for record controlled machines comprising a series of contact strips each corresponding to an index point position of a record to be selected and arranged in parallel spaced relation, said strips being differentially selectively slidable longitudinally relative to each other; a series of contact elements moving in a fixed path transversely of said strips whereby to progressively contact the strips, each of said elements corresponding to one column in a field of the record to be selected, and means on the strips whereby the longitudinal movement of any selected strip varies the number of electrical contacts of said contact elements with the strip in accordance with a predetermined schedule.

12. A selector for record controlled machines comprising a series of rotary circuit closing devices, one for each column of a field in which classification numbers are recorded, a switch bar common to all of said devices, and means operated by said switch bar for selectively controlling the number of contacts made by the rotary switching devices, a scale of classifications, and a finger piece for selectively setting the switch bar in accordance with said scale of classification.

13. In a machine controlled by records identified by classification designations disposed in a field comprising a plurality of columns, a machine control element, sensing means for each column, means cooperating with the sensing means for operating the control element in accordance with the classification designations, and a series of manually operable members each common to all the columns of said field and variably settable in accordance with a scale of classifications, each member cooperating with the operating means to cause the latter to operate the machine control element in accordance with a group of classifications, all of said members conjointly and simultaneously controlling the operating means to cause the machine control element to be operated in accordance with a plurality of groups of classifications.

RALPH E. PAGE.